United States Patent [19]

Wepner et al.

[11] 4,339,972

[45] Jul. 20, 1982

[54] METHOD AND APPARATUS FOR VOLUMETRIC PARTITIONING OF ROD-LIKE MATERIAL

[75] Inventors: Joachim Wepner, Gevelsberg; Kurt Wengenroth, Wuppertal; Jochen Zuhlke, Gevelsberg, all of Fed. Rep. of Germany

[73] Assignee: Rolf Peddinghaus, Ennepetal, Fed. Rep. of Germany

[21] Appl. No.: 131,770

[22] Filed: Mar. 19, 1980

[30] Foreign Application Priority Data

Mar. 21, 1979 [DE] Fed. Rep. of Germany ....... 2911364

[51] Int. Cl.$^3$ ............................................... B26D 5/20
[52] U.S. Cl. .......................................... 83/13; 83/71; 83/209; 83/364; 83/367; 83/467 R; 33/1 V; 33/123

[58] Field of Search ................. 33/1 V, 121, 123, 124; 83/367, 71, 13, 364, 368, 370, 209, 467 R; 364/475

[56] References Cited

U.S. PATENT DOCUMENTS

| | | | |
|---|---|---|---|
| 3,133,571 | 5/1964 | Hensgen et al. | 83/364 |
| 3,154,673 | 10/1964 | Edwards, Jr. | 33/1 V |
| 3,762,257 | 10/1973 | Mathews, Jr. | 83/364 |
| 4,221,143 | 9/1980 | Ritter et al. | 83/71 X |

FOREIGN PATENT DOCUMENTS 1064707 4/1967 United Kingdom ................ 364/475

*Primary Examiner*—William D. Martin, Jr.
*Attorney, Agent, or Firm*—Holman & Stern

[57] ABSTRACT

A method and apparatus for the accurate volumetric subdivision of conveyed bar-shaped material such as bar steel or billets, using measurements of the bar's cross-sectional area.

10 Claims, 2 Drawing Figures

METHOD AND APPARATUS FOR VOLUMETRIC PARTITIONING OF ROD-LIKE MATERIAL

BACKGROUND OF THE INVENTION

This invention relates to a method of volumetric subdivision of conveyed bar-shaped material such as bar steel or billets, wherein the cross-section of the bar-shaped material is measured and in accordance with this measured value a length stop is adjusted by means of a computer in such a way as to enable a length of blank material having a predetermined value to be severed from the stock.

The invention also relates to an apparatus for the application of this method.

A method of this kind as well as apparatus for the application thereof is disclosed in German Patent 316 276. According to this West German Patent the bar-shaped material or stock which is in course of being conveyed is conducted through an annular measuring coil surrounding the stock, the coil being part of an electric circuit and its impedance varying in relation with the cross section of the material passing therethrough. This variation is picked up as a measure of the cross section and processed by means of a computer in such a way that a length stop is automatically adjusted in relation to the size of the cross section so that ultimately a portion of the computer-determined length can be severed from the material by means of a shearing blade.

This kind of volumetric subdivision of the material is of considerable importance for the subsequent working of the severed portion whenever such further working or treatment requires that the severed portion or blank should precisely fill a given volume. This is the case, for example, in non-cutting deformation or shaping processes, such as drop forging, the aim being here not only that a given die cavity should be completely filled by the material but also that there should be no burr or flash or at any rate that this should be confined to a minimum. A laterally squeezed-out flash, or burr, will, as a general rule, not only represent a loss of material, but also require one or more working passes for its elimination. Further, it will entail heavier wear in the region of the edge of the die so that the desired shape cannot be achieved with the required degree of accuracy. In practice it is customary to have an average 8 to 9% excess volume for the blank in order to make sure that the die is completely filled. According to the above mentioned German Pat. No. 316 276 this excess can be cut down to as little as ±2%.

Other known methods rely on the weight/volume ratio of the material and provide for the initial cutting of a sample blank, of which the weight is ascertained, whereupon the subsequent blanks are cut to that length which corresponds to a blank weight which is capable of filling a predetermined volume. However, here, too, tolerances of the order of ±0.5% must be permitted. Examples of this kind of method are described in GL-PS No. 96 041 and German Laid-Open Specification No. 2,259,950.

SUMMARY OF THE INVENTION

The present invention achieves a substantial reduction in respect of these previous tolerances so as to enable the production, for example, of virtually flash-free drop forgings.

According to this invention there is provided a method for the volumetric subdivision of conveyed bar-shaped material such as bar steel or billets, wherein the cross-section of the bar-shaped material is measured, and in accordance with this measured value a length stop is adjusted by means of a computer in such a way as to enable a length of blank material to be severed from the stock which has a predetermined volume of material.

More specifically, two pairs of contact sensors, which are maintained in contact with the stock surface, are slidingly advanced (jointly and in relatively inclined directions of feed) over the sides of the bar section and in a direction of right angles to the direction the bar-stock is conveyed. These contact sensors are maintained in contact with mutually perpendicularly opposite points of the material section, the distance between the sensors is measured in relation to the feed, and the measurement fed into the computer. Preferably, the distances between the sensors are measured starting from a predetermined minimum value for the cross-section.

This invention also provides apparatus for carrying out the above method, wherein the sensors are contact rollers mounted on jointly advanceable and relatively movable caliper jaws, with the roller circumferences projecting beyond the mutually facing inside edges of said jaws, and wherein the caliper jaws are maintained relative to each other by means of a first spring. In one embodiment the caliper jaws are displaceable at right angles to their direction of feed and mounted in precision roller-bearing guided caliper holders. In another embodiment the jaws or the caliper holders are movably mounted on a slide and jointly supported in a floating manner in a transverse direction relative to their direction of feed, and so maintained by a second spring which is weaker than the first spring, which holds the caliper jaws together. In still another embodiment, the feed movement of the pairs of jaws is synchronized by means of a pair of gearwheels which are in mesh with the guide means of their associated slides, and with one another. In yet another embodiment, photodiode switches are lined up with the tooth gaps of the first of the gearwheels and with the tooth crests of the second of the gearwheels, both of said photodiode switches feeding signals to two input terminals of an OR logic gate associated with the computer, the gate pulses being applied as incremental feed signals to the computer, which on each impulse picks up the distances between the two sensors.

In this way one arrives at a volume determination which, considered in the final analysis, is based solely on geometric measuring. However, by conventional means, e.g. application of the sliding gauge principle, such geometric measuring cannot be applied to blank material travelling on a conveyor to a further working station. The main reason for this is that such material, by reason of its origin, does not yet possess the necessary dimensional accuracy. This kind of material, particularly billet steel, tends to have comparatively uneven surfaces, or sides, due to the rolling or continuous casting process whereby it is produced. Such uneven surfaces are nearly always present, at least in a billet, on all sides thereof. Moreover, a comparatively precise statement can be made concerning the curvature in the corner regions of the billet because the roll calibers impose a virtually constant radius of curvature in these corner regions. Consequently there is comparatively very little variation in the rounding of the corners so that this can be fed as a constant into the computer. Whereas the remaining measurements are subject to the above mentioned variations, these can now be taken into account and ascertained with the aid of contact sensors. These sensors move in a direction of feed which is normal to the direction of conveying of the bar stock. This means that either the contact sensors must travel with the material for a short distance, or the material on the conveyor must be temporarily stopped and brought into the operative range of a measuring device.

By ascertaining the distances between the sensors, and particularly by application of two pairs of contact sensors in relation with the feed, or advancement of the sensors, it is possible, by integration of the measured values, to obtain very precise information concerning the cross sectional dimension of the material. This measuring method corresponds, as it were, to a complete grid scanning of the entire cross sectional area, although the actual measurements need only be taken at the periphery of this cross sectional area.

In view of the fact that the corner radii of the material, notably of billets, are known, it is advisable to measure the distances between contact sensors for the purpose of cross sectional determination only upwards of a predetermined minimum value, which minimum value already includes the greater part of the curvature or rounding.

While the foregoing description refers primarily to billets which have a substantially square cross-sectional configuration, it will be appreciated that the method according to this invention can be applied in principle to any other cross sectioned configuration, thus also including round sectioned material. Since the contact sensors always make contact with the material only on two mutually opposite points of its cross section, they are able in principle to advance along any desired curved line.

The provision of sensor elements in the form of rollers which project beyond the inside edges of caliper jaws enables a particularly precise scanning of the surface of the material. Since these contact rollers may have a comparatively small diameter they can also detect dimensional deviations which are confined to a very small length in the feed direction. The spring holds the caliper jaws, and with them the contact rollers, constantly pressed together at a preselected force thereby ensuring that contact is always preserved between the rollers and the surface of the material.

A particularly advantageous feature is the movability of the jaws in a direction at right angles to their feed direction, which not only simplifies the evaluation of relative jaw distances but also ensures identical conditions for roller contact with the material in each and any position of feed. A precision roller bearing guide system, which may be a needle-cage system, prevents tilting of the caliper jaws.

In principle the caliper jaws can be manually adjusted to any given cross section. However, according to one embodiment of this invention mentioned above, automatic jaw adjustment is obtained because the floating slide on which the caliper jaws are carried will first of all seek to occupy that position in which the center between the two jaws coincides exactly with the cross sectional center line. The relatively weak second spring which holds the slide in place does not influence the force at which the jaws are held together by their spring.

While the distance between jaws in a direction which is at right angles to the feed direction can thus be very accurately measured and fed into the computer, another embodiment mentioned above using photodiode switches reflects the prerequisite condition which allows a precise coordination of these jaw distances with the feed data which are also processed in the computer. The arrangement proposed in this embodiment enables this to be achieved in a particularly precise form because feed variations can here be incrementally transferred at very high precision. The directional line up of the photodiode-switches with the tooth gaps in one and the tooth crests in the other of the two gear wheels has the result that the smallest feed measure which can be resolved in predetermined by one half of the tooth gap size. The size of the tooth gaps can be predefined not only by the tooth or gear module but also by the diameter of the gearwheels in virtually any desired manner so as to provide an extremely accurate control value for jaw feed.

Preferably gears are also used for ascertaining the relative distance between two jaws at any given point, for example by providing one slide with a rack bar while the other slide carries a gearwheel in mesh with said rack bar and connected with a function generator. Such an arrangement provides a continuous length measurement which is called up on each impulse fed by the feed device to the computer.

DESCRIPTION OF THE PREFERRED EMBODIMENTS

Figure 1:
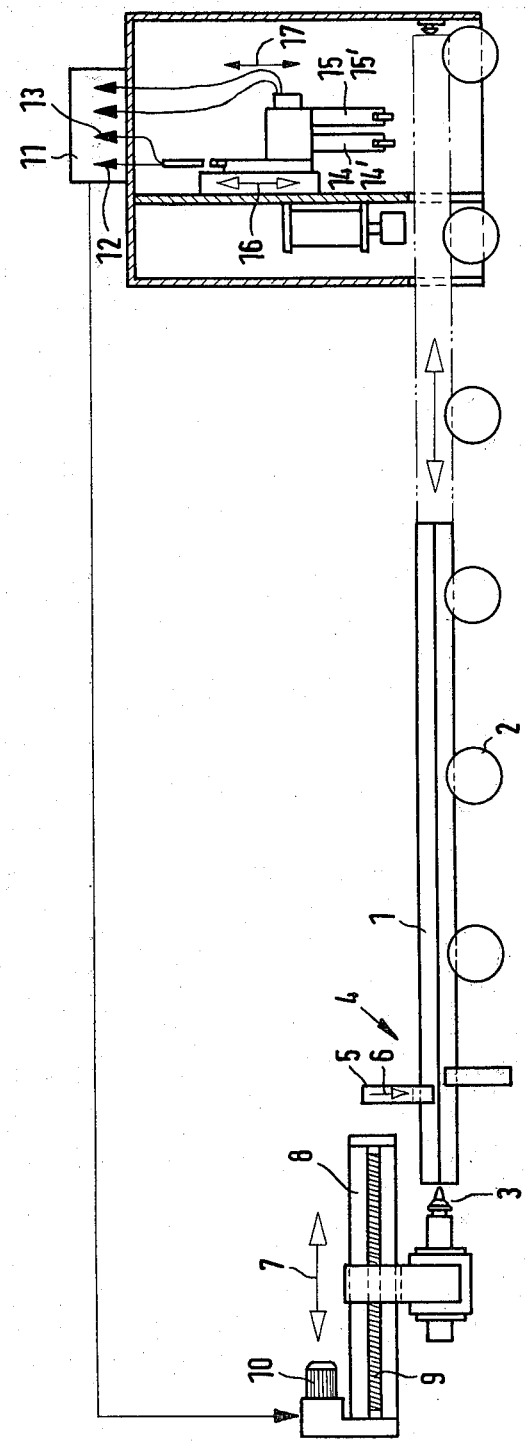
FIG. 1 is a schematic view of the apparatus as a whole.

FIG. 1 shows a billet 1 designed to be conveyed in the direction of its length by means of the roller table rollers 2. As shown in this figure its left end abuts an end stop 3. This is the position in which the upper blade 5 of the shears 4 is released to descend in the direction of arrow 6 so that a portion is severed from the billet 1 the length of which is determined by the position of the end stop 3. The end stop 3 is adjustable in the direction of the double headed arrow 7 in a longitudinal guideway 8 by means of the screw spindle 9. The screw spindle 9 is connected with a motor 10 which is an adjusting motor and receives its adjusting pulses from the computer 11. The computer 11 is fed, in all, with four electrical data impulses, namely in each case one feed signal 12 and one distance signal 13 for each of the two sensor elements, already described. The two sensor elements are mounted on pairs, or sets of caliper jaws 14,14' and 15,15' which pairs are adapted to be advanced at right angles relative to each other. The jaws 14,14' are adapted to be advanced in the feed direction indicated by the double-headed arrow 16 while the other pair 15,15' is slidable in a perpendicular direction relative to the first pair 14,14'. Thus the relative distance of the jaw pairs can be varied in accordance with the double headed arrows 16,17 in correspondence with the width of the billet which is to be measured. The measuring direction for the two sets of pairs of jaws is at right angles to one another.

For measuring the cross section of a billet the latter is first advanced on the roller table into a position shown on the right hand side of the drawing which brings it within the operative range of the above described measuring device. At this stage the caliper jaws and their contact sensors or rollers are still in their retracted starting position so that they cannot come into contact with the billet while it is being positionally approached to the device.

Figure 2:
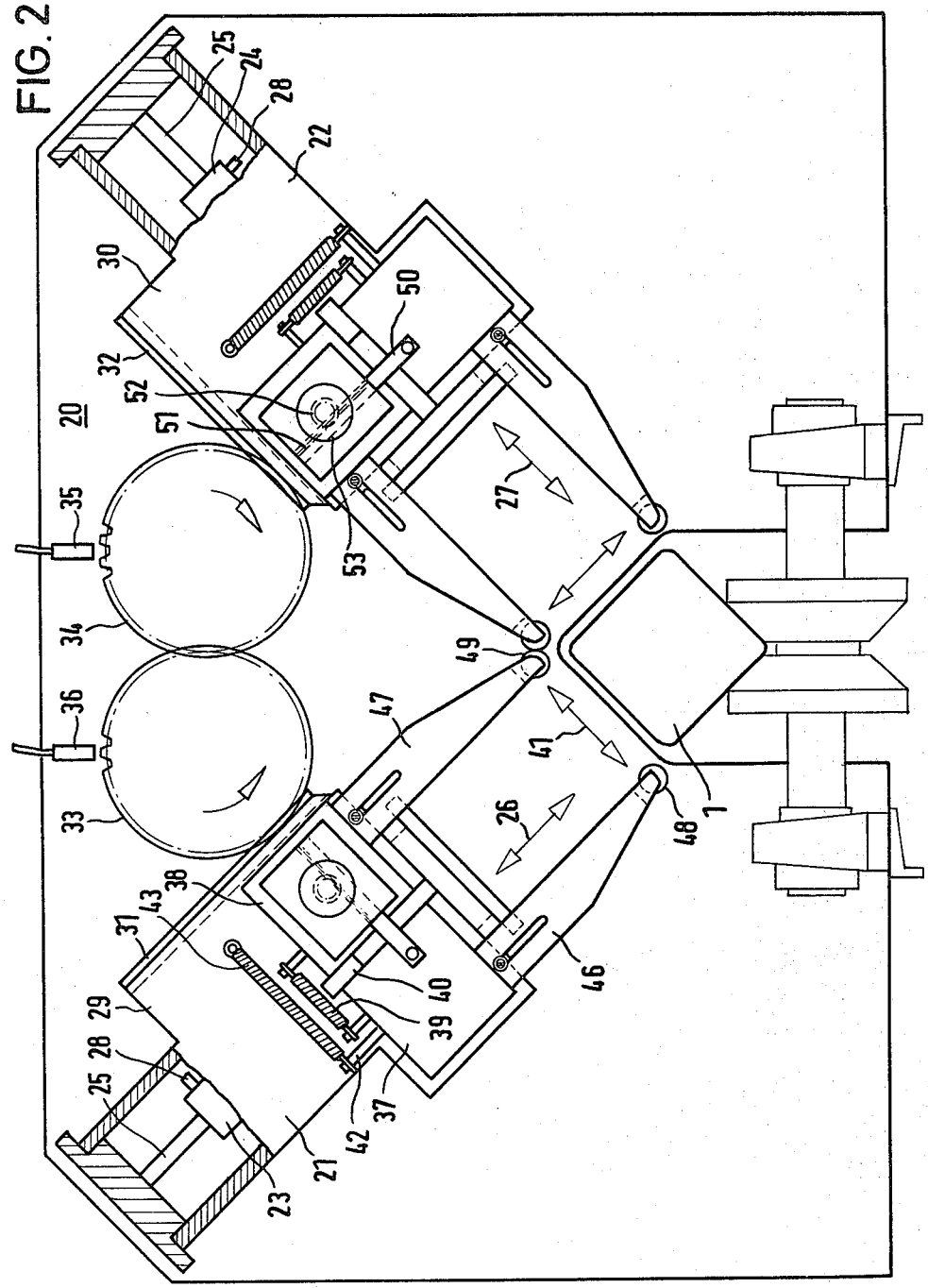
FIG. 2 is a cross-sectional view illustrating the measuring device.

FIG. 2 illustrates how the measurements on the billet are taken.

FIG. 2 shows the billet 1 which has been transported by means of the rollers 18, in an upended, diamond position, into the correct measuring position and there temporarily arrested. A mounting frame 20 carries the entire measuring device, wherein two slides 21 and 22 are relatively slidable at right angles to one another. This sliding movement is obtained with the aid of hydraulic cylinders 23,24 mounted in the frame 20. The slides in their turn are connected with piston rods 25 and can be displaced in the direction of the double headed arrows 26,27 when pressure is applied to the hydraulic cylinders 23,24, by the admission of a suitable pressure medium, preferably hydraulic fluid, through the connecting pipe 28. The piston and connecting pipe shown in the left hand part of the drawing correspond to that in the right hand part of the drawing.

Each slide 21,22, carries a rack bar 31,32, respectively mounted on slide part 29,30 and in mesh with an associated gearwheel 33,34. This ensures precise synchronisation of the movements of both slides 21,22 in the direction of feed 26,27. One of the gear wheels, 34 is associated with a photodiode switch 35 which is lined up with the tooth gaps while for the other gear wheel 33 a corresponding photodiode switch 36 is provided in line with the gear crests. This arrangement enables an incremental feed signal being fed to the earlier described computer (microprocessor) with a resolvable rhythm or clock measure which corresponds to half the value of one tooth gap of the gearwheels 34,33.

The caliper holders are floatingly supported on the slides 21,22. The following description of these caliper holders applies to both sides of the drawings although the appropriate reference numbers have been omitted on the right hand side of the drawing for clearer representation. The two caliper holders 37,38 of slide 21 are mutually connected by means of a first tension spring 39 and maintained at a minimum relative distance by the spacer element 40. They are fitted with precision guides and adapted to be slidingly displaced in the direction of the double-headed arrow 41. Since the slide 21 itself is elastically connected by means of an arm 42 with the piston rod 25, the two caliper holders 37,38 can initially without relative movement occupy a position in which they are precisely lined up with the cross section of the billet 1 or like piece which is to be measured. The second tension spring 43 which is associated with the slide 21 is weaker than the tension spring 39 and does therefore not affect the movement of the caliper holders 37, 38.

The caliper holders 38,39 comprise connector flanges or strips 44,45 with dove-tail guides on which the caliper jaws 46,47 can be initially set to different relative distances for an initial rough adjustment to specified cross sectional dimensions. The distance between the caliper holders is selected such as to ensure sufficient relative movability to cover a wider range.

The frontal ends of the caliper jaws 46,47 carry contact rollers 48,49 which can adapt to engage with a billet in accordance with its width, so that during feed or advancement in accordance with the double headed arrow 26 the rollers 48,49 travel over the surface of the stock. In the course of this travel the distance between the caliper jaws 46,47 varies in the direction of the double headed arrow 41.

One of the caliper holders, or also one of the two caliper jaws, is provided with an arm 50 which carries a rack bar 51. The latter is in mesh with the pinion 52 of a function generator 53 which is in connection with the other caliper holder or with the other jaw. The output signals of the function generator 53 are fed to the computer and there called up at the clock rhythm set by the photodiode switches 35,36. Slide 22 is equipped in precisely the same way as slide 21 so that there, too, signals reflecting the sensor measurements are transmitted to the computer.

In the final result it is possible, by application of the present invention, to achieve a volumetrically extremely precise subdivision or severing of the blank sections from the stock. In actual fact, according to this invention the low tolerance of ±0.5% which had been achieved by weight-measuring methods can be halved so that the blanks thus severed from a billet can be deformed virtually flash- or burr-free in the die.

We claim:

1. A method for the volumetric subdivision of a lengthwise conveyed bar-shaped material comprising:
    measuring the width of a notional cross-section of the bar-shaped material by a first caliper means having opposed sensors on the ends of each caliper jaw, by slidingly advancing said first caliper means at a right angle to the direction of conveying said bar, so that the opposed sensors of the first caliper means are maintained in slidable contact with mutually perpendicular opposite points on opposite sides of said bar,
    measuring the length of a notional cross-section of the bar-shaped material at a relatively inclined direction to the measurement of the width by a second caliper means having opposed sensors on the ends of each caliper jaw, by slidingly advancing said second caliper means at a right angle to the direction of conveying said bar, so that the opposed sensors of the second caliper means are maintained in slidable contact with mutually perpendicular opposite points on opposite sides of said bar,
    feeding the cross-sectional width measurements from the first caliper means and the cross-sectional length measurements from the second caliper means into a computer which is programmed to calculate a predetermined volume of said bar from the measured width and length of the notional cross-sections and a variable distance of lengthwise conveyance, and to generate a signal to a severing means and an end stop spaced a variable distance from said severing means,
    adjusting the end stop distance from the severing means by the generated computer signal so that the predetermined volume of said bar may be severed by said severing means,
    conveying said bar lengthwise until one end abuts the end stop, and
    severing the bar at the computed length, whereby a subdivision of said bar-shaped material having the predetermined volume is produced.

2. The method of claim 1 wherein the distance between the opposed sensors of each caliper means are measured starting from a predetermined minimum value.

3. The method of claim 1 wherein the cross-section of the bar is generally squared and the relatively inclined directions of the measurement of the cross-section width to the cross-section length are at about a 90° angle to each other.

4. An apparatus for the volumetric subdivision of a lengthwise conveyed bar-shaped material comprising:
   conveying means for horizontally conveying the bar in a lengthwise direction,
   first caliper means comprising two caliper jaws having an opposed sensor means at the end of each jaw,
   first means for slidably advancing and retracting said first caliper means in a direction perpendicular to the direction of conveyance of said bar, so that the width of a notional cross-section of the bar may be measured by measuring the distance between the opposed sensors of the first caliper jaws,
   second caliper means comprising two caliper jaws having an opposed sensor means at the end of each jaw,
   second means for slidably advancing and retracting said second caliper means in a direction perpendicular to the direction of conveyance of said bar, so that the length of a notional cross-section of the bar may be measured by measuring the distance between the opposed sensors of the second caliper jaws,
   a mounting frame supporting said first means for slidably advancing and retracting said first caliper means at a relatively inclined angle to said second means for slidably advancing and retracting said second caliper means, said mounting frame being encompassed about one end of said horizontal conveying means,
   bar severing means located a distance from the other end of said horizontal conveying means,
   an end stop located at the same end of said horizontal conveying means in which the severing means is located adapted to prevent further horizontal conveyance of said bar,
   adjustment means for varying the distance between said end stop and said severing means, and
   computer means programmed to receive a signal from said first caliper means measuring the width of a notional cross-section of said bar and to receive a signal from said second caliper means measuring the length of a notional cross-section of said bar, and to generate a signal to said end stop varying the distance of said end stop from said severing means, whereby a subdivision of said bar having a predetermined volume may be severed from said bar-shaped material.

5. The apparatus of claim 4 wherein the opposed sensors of each caliper means are contact rollers mounted on jointly advanceable and relatively movable caliper jaws, with the roller circumferences projecting beyond the mutually facing inside edges of said jaws, and wherein the caliper jaws are maintained relative to each other by means of a first spring.

6. The apparatus of claim 5 wherein the jaws of each caliper means are displaceable at right angles to the direction of its slidable advancing and retracting and are mounted in precision roller-bearing-guided caliper holders.

7. The apparatus of claim 5 or 6 wherein the jaws of each caliper means are movably mounted on a slide and jointly supported in a floating manner in a transverse direction relative to their direction of feed and are so maintained by a second spring which is weaker than said first spring.

8. The apparatus of claim 6 wherein the caliper holders are movably mounted on a slide and jointly supported in a floating manner in a transverse direction relative to their direction of feed and are so maintained by a second spring which is weaker than said first spring.

9. The apparatus of claim 7 wherein the feed movement of the jaws of each caliper means is synchronized by means of a separate gear wheel, said gear wheels each being in mesh with the guide means of their associated slides and with one another.

10. The apparatus of claim 9 wherein photodiode switches are provided for each gear wheel, one photodiode switch being lined up with the tooth gaps of one gear wheel and the other photodiode switch being lined up wih the tooth crests of the other gear wheel.

* * * * *